United States Patent
Liu

(10) Patent No.: US 9,383,636 B2
(45) Date of Patent: Jul. 5, 2016

(54) PICO PROJECTOR SYSTEM AND ADDITIONAL THERMAL DISSIPATING METHOD THEREOF

(71) Applicants: Sintai Optical (Shenzhen) Co., Ltd., Shenzhen, Guandong Province (CN); Asia Optical International Ltd., Tortola (GB)

(72) Inventor: Sen-Yung Liu, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 420 days.

(21) Appl. No.: 13/917,763

(22) Filed: Jun. 14, 2013

(65) Prior Publication Data
US 2014/0152965 A1    Jun. 5, 2014

(30) Foreign Application Priority Data
Nov. 30, 2012   (TW) .............................. 101144926 A

(51) Int. Cl.
  *G03B 21/16*   (2006.01)
  *G03B 21/14*   (2006.01)

(52) U.S. Cl.
  CPC .............. *G03B 21/16* (2013.01); *G03B 21/145* (2013.01)

(58) Field of Classification Search
  CPC ................................. G03B 21/14; G03B 21/16
  USPC ...................... 353/39, 52–61; 348/333.1, 374, 348/743–747; 361/692, 709
  See application file for complete search history.

(56) References Cited

U.S. PATENT DOCUMENTS

| | | | |
|---|---|---|---|
| 8,610,523 B2 | 12/2013 | Ku et al. | |
| 2006/0203206 A1* | 9/2006 | Kim | G03B 21/16 353/58 |
| 2007/0091276 A1* | 4/2007 | Zakoji | G03B 21/16 353/54 |
| 2011/0025985 A1* | 2/2011 | Karasawa | G03B 21/16 353/54 |
| 2011/0176118 A1* | 7/2011 | Wu | G03B 21/16 353/61 |
| 2011/0267780 A1* | 11/2011 | Thrailkill | F21S 48/328 361/709 |
| 2012/0314398 A1* | 12/2012 | Raring | H01S 5/34333 362/84 |
| 2013/0057835 A1* | 3/2013 | Reis | F21V 29/004 353/52 |

FOREIGN PATENT DOCUMENTS

TW   201232152 A   8/2012
TW   M438667       10/2012

OTHER PUBLICATIONS

English Abstract translation of TWM438667 (Published Oct. 1, 2012).

* cited by examiner

*Primary Examiner* — Sultan Chowdhury
(74) *Attorney, Agent, or Firm* — McClure, Qualey & Rodack, LLP

(57) ABSTRACT

A pico projector system and an additional thermal dissipating method for the pico projector system are provided. The pico projector system includes a pico projector main body and a thermal dissipating module. The additional thermal dissipating method includes the steps of thermally dissipating the pico projector main body; externally connecting the thermal dissipating module to the pico projector main body; and thermally dissipating the pico projector main body by the thermal dissipating module.

13 Claims, 5 Drawing Sheets

PICO PROJECTOR SYSTEM AND ADDITIONAL THERMAL DISSIPATING METHOD THEREOF

BACKGROUND OF THE INVENTION

1. Field of the Invention

The invention relates to a pico projector system and an additional thermal dissipating method thereof, and in particular relates to a thermal dissipating method in which a detachable thermal dissipating module, including a fan and/or a thermal dissipation fin unit, is additionally used for enhancing the thermal dissipating effect of a pico projector system.

2. Description of the Related Art

Generally, the light-emitting diode (LED) source in a pico projector has a very low efficiency, wherein about 80% power is converted into waste heat. Lifespan of the pico projector will be lessened if the working temperature is too high.

A thermal dissipating fin unit is a common thermal dissipating tool used in different devices and systems. To avoid a high-speed growth of waste heat in a high power pico projector, an increased dissipating area of a thermal dissipating fin unit is required. In such an arrangement, however, the pico projector cannot be lightweight, thin and compact.

Therefore, the development of a pico projector provided with optimistic thermal dissipating effect and a small size is a significant issue.

BRIEF SUMMARY OF THE INVENTION

In order to overcome the above-described difficulties in conventional skills, the invention provides a pico projector system including a pico projector main body and an additional detachable thermal dissipating module. The thermal dissipating module is detachably and externally connected to the pico projector main body to thermally dissipate the pico projector main body.

In the pico projector system, the pico projector main body includes a metal substrate, a heat pipe and a thermal dissipating fin unit, in which the heat pipe is configured to transfer waste heat generated from the metal substrate to the thermal dissipating fin unit, and the thermal dissipating module is configured to thermally dissipate the thermal dissipating fin unit.

In the pico projector system, the heat pipe is a straight heat pipe.

The pico projector system may further include a support frame extended along a profile of the metal substrate, in which the support frame is contacted with the metal substrate, and the heat pipe is welded on the support frame.

In the pico projector system, the support frame may be an L-type support frame contacting the metal substrate.

In the pico projector system, the thermal dissipating module may include a magnet, and the pico projector main body may include a metal part, so that the thermal dissipating module can be secured on the pico projector main body when the magnet of the thermal dissipating module attracts the metal part of the pico projector main body.

Alternatively, the thermal dissipating module may include a metal part, and the pico projector main body may include a magnet, so that the thermal dissipating module can be secured on the pico projector main body when the magnet of the pico projector main body attracts the metal part of the thermal dissipating module.

Alternatively, the thermal dissipating module may include a first magnet, and the pico projector main body may include a second magnet, so that the thermal dissipating module can be secured on the pico projector main body when the first magnet of the thermal dissipating module attracts the second magnet of the pico projector main body.

In the pico projector system, the thermal dissipating module may include a connecting port connected to the pico projector main body, so that the pico projector main body can provide the thermal dissipating module with power.

In the pico projector system, the thermal dissipating module may include an accommodation space allowing the pico projector main body to be tightly fitted therein.

In the pico projector system, the thermal dissipating module may include a groove, and the pico projector main body may include a sliding block corresponding to the groove of the thermal dissipating module, so that the thermal dissipating module can be secured on the pico projector main body when the sliding block of the pico projector main body is installed in the groove of the thermal dissipating module.

Alternatively, the thermal dissipating module may include a sliding block, and the pico projector main body may include a groove corresponding to the sliding block of the thermal dissipating module, so that the thermal dissipating module can be secured on the pico projector main body when the sliding block of the thermal dissipating module is installed in the groove of the pico projector main body.

The invention also provides an additional thermal dissipating method for a pico projector system, including the steps of thermally dissipating a pico projector main body; externally connecting a thermal dissipating module to the pico projector main body; and thermally dissipating the pico projector main body by the thermal dissipating module.

In the additional thermal dissipating method, the thermal dissipating module is connected to the pico projector main body when a consumed power of the pico projector main body is greater than a predetermined value.

In the additional thermal dissipating method, the predetermined value is approximately equal to 2.5 watts.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
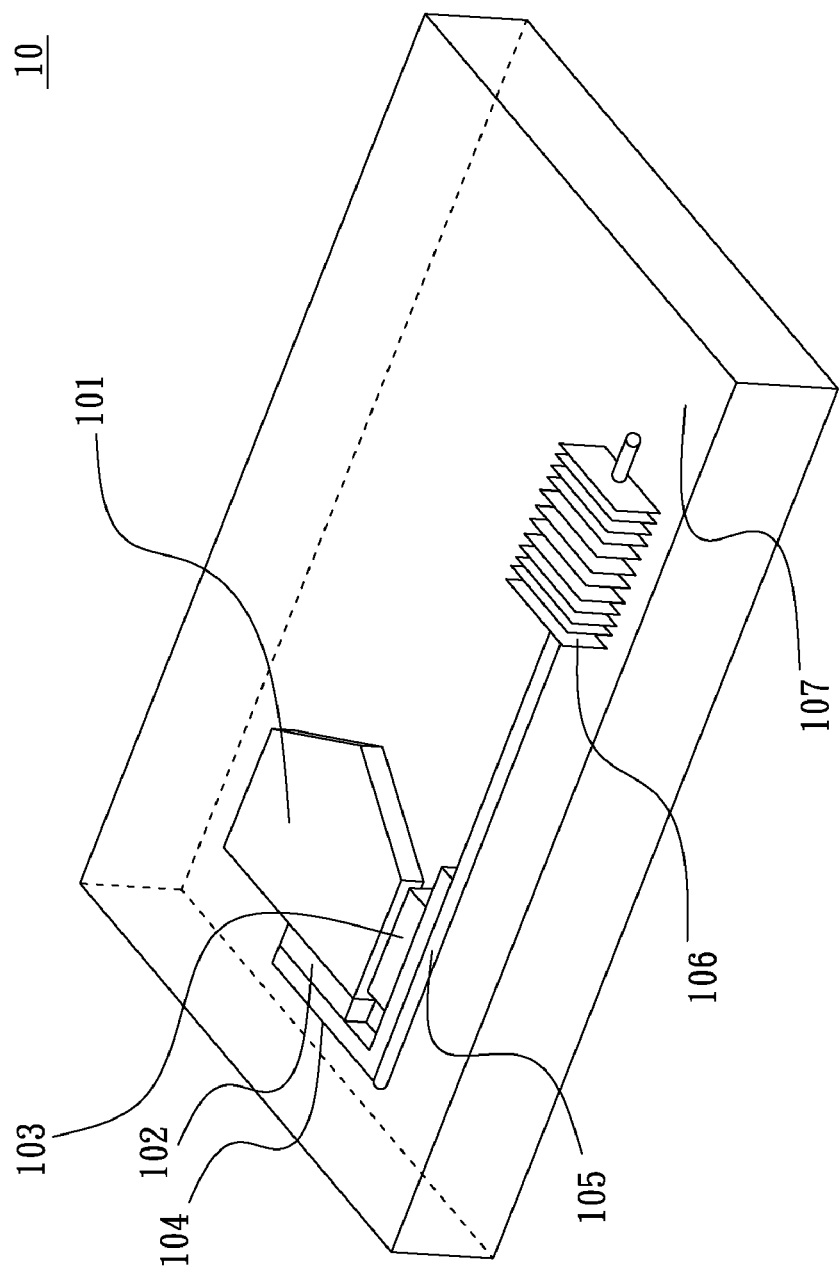
FIG. 1 is a schematic view of a pico projector main body of the invention.

FIG. 1 is a schematic view of a pico projector main body 10 of a pico projector system of the invention. The pico projector main body 10 includes an optical engine 101 and metal substrates 102 and 103. A support frame 104 is configured to serve as a thermal dissipating medium for the metal substrates 102 and 103. The metal substrates 102 and 103 have light-emitting diodes (LEDs) disposed thereon for generating a light beam. After passing through the optical engine 101, the light beam is provided with image information and is outwardly projected. In the pico projector main body 10, the metal substrates 102 and 103 are the major heat sources. The support frame 104 extending along profiles of the metal substrates 102 and 103 is contacted with the metal substrates 102 and 103. In this embodiment, the support frame 104 is an L-type support frame contacting both of the metal substrates 102 and 103.

The pico projector main body 10 further includes a heat pipe 105, a thermal dissipating fin unit 106 and a pico projector casing 107, in which two ends of the heat pipe 105 are respectively connected to the support frame 104 and the thermal dissipating fin unit 106. In operation, waste heat generated from the metal substrates 102 and 103 is transferred to the thermal dissipating fin unit 106 through the heat pipe 105 and dissipated via natural convection. To facilitate natural convection, the pico projector casing 107 can be provided with thermal dissipating holes (not shown in FIGs.) at the vicinity of the thermal dissipating fin unit 106.

The support frame 104 and the heat pipe 105 can be connected by welding, and the heat pipe 105 is a straight heat pipe, thereby promoting the heat transfer efficiency.

If a pico projector system has a consumed power greater than a predetermined value (e.g., 2.5 watts) and produces more waste heat, a thermal dissipating module (including a fan and/or a thermal dissipating fin unit) can be further installed in the pico projector system of the invention, thereby performing a forced convention to the thermal dissipating module with enhanced thermal dissipating effect. The related contents are described in detail as below.

Figure 2:
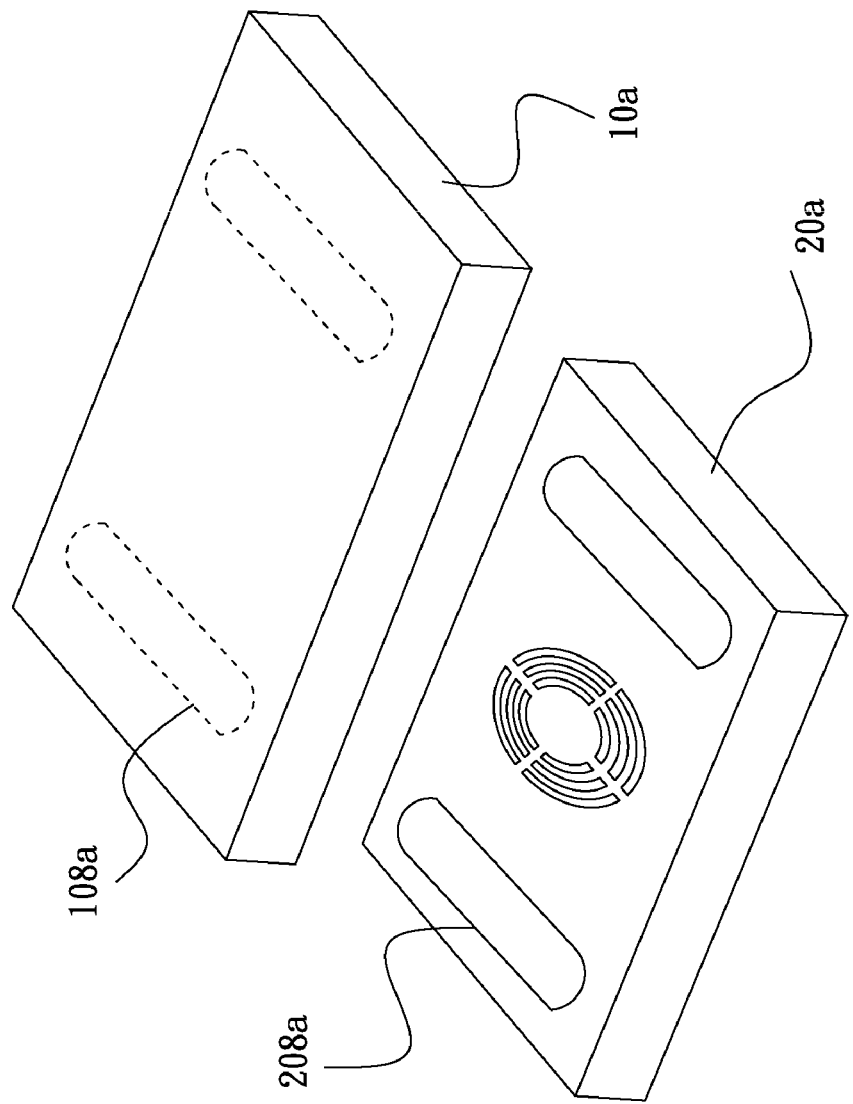
FIG. 2 shows a pico projector system of the invention collocated with a thermal dissipating module according to an embodiment of the invention.

FIG. 2 shows a pico projector system of the invention collocated with a thermal dissipating module according to an embodiment of the invention. In this embodiment, the pico projector system includes a pico projector main body 10a and a thermal dissipating module 20a, in which the thermal dissipating module 20a is detachably and externally connected to the pico projector main body 10a and configured to thermally dissipate the pico projector main body 10a.

The pico projector main body 10a includes a metal part 108a, and the thermal dissipating module 20a includes a magnet 208a, in which the thermal dissipating module 20a is secured on the pico projector main body 10a when the magnet 208a of the thermal dissipating module 20a attracts the metal part 108a of the pico projector main body 10a. Accordingly, a forced convention can be performed to thermally dissipate a thermal dissipating fin unit (not shown in FIGs.).

It is understood that the thermal dissipating module can include a metal part and the pico projector main body can include a magnet, so that the thermal dissipating module can still be secured on the pico projector main body when the magnet of the pico projector main body attracts the metal part of the thermal dissipating module. Alternatively, the thermal dissipating module can include a first magnet and the pico projector main body can include a second magnet, so that the thermal dissipating module can still be secured on the pico projector main body when the first magnet of the thermal dissipating module attracts the second magnet of the pico projector main body.

Figure 3:
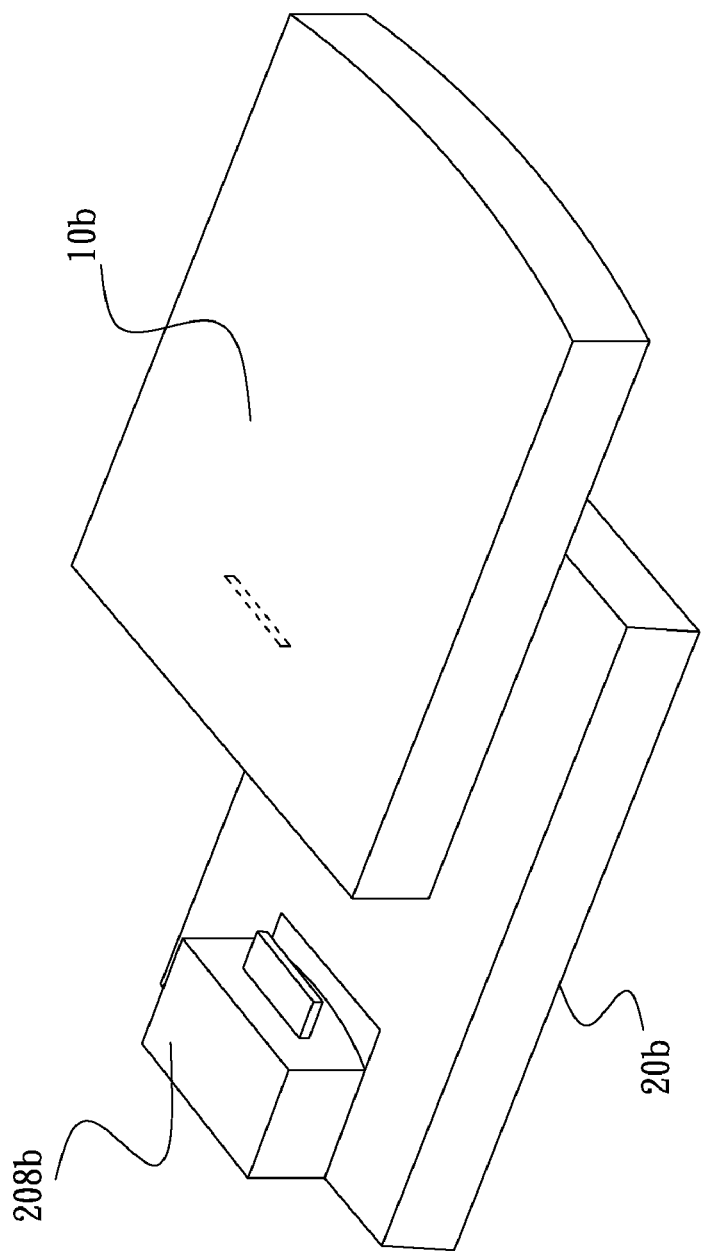
FIG. 3 shows a pico projector system of the invention collocated with a thermal dissipating module according to another embodiment of the invention.

FIG. 3 shows a pico projector system of the invention collocated with a thermal dissipating module according to another embodiment of the invention. In this embodiment, the pico projector system includes a pico projector main body 10b and a thermal dissipating module 20b. The thermal dissipating module 20b includes a movable connecting port 208b, in which the mobile connecting port 208b is hidden therein in non-usage time, and the mobile connecting port 208b can be pushed out (shown in FIG. 3) in usage time to connect the pico projector main body 10b so that the pico projector main body 10b can provide the thermal dissipating module 20b with power. Accordingly, a forced convention can be performed to thermally dissipate a thermal dissipating fin unit (not shown in FIGs.) located inside the pico projector main body 10b.

Figure 4:
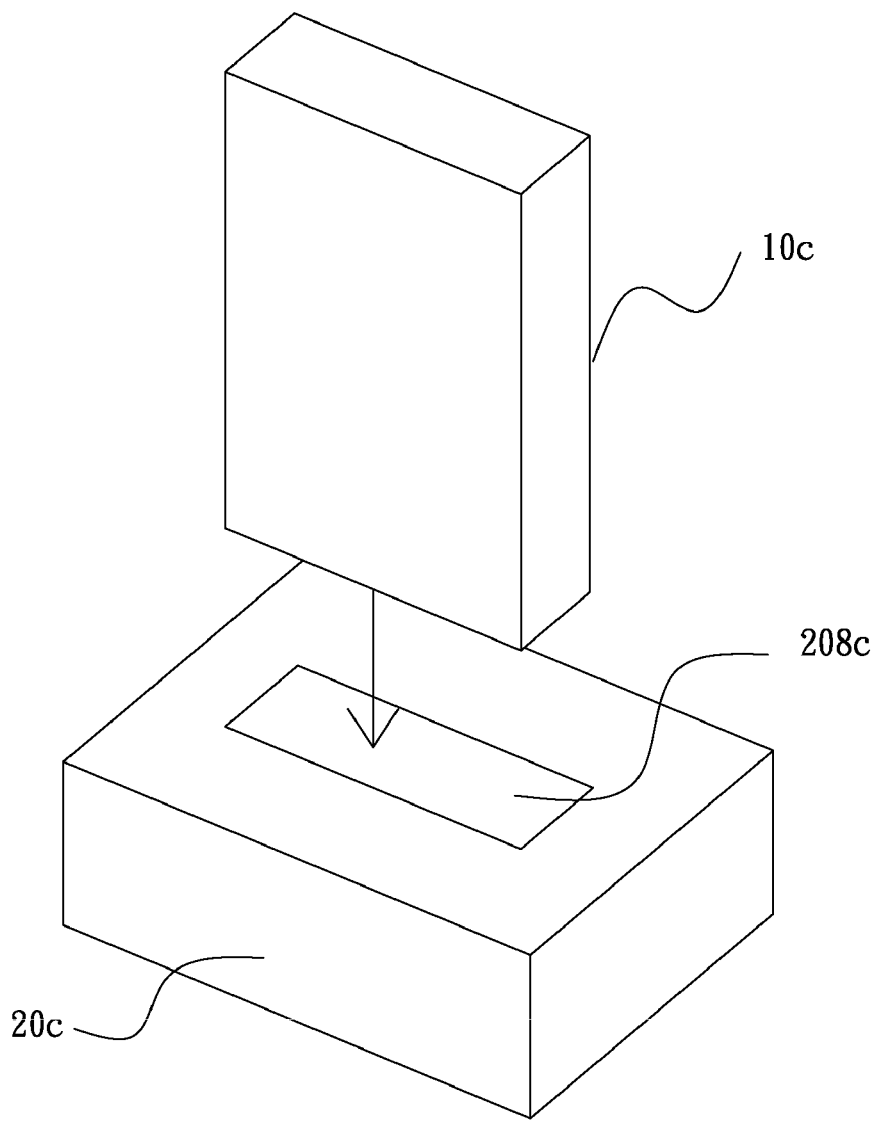
FIG. 4 shows a pico projector system of the invention collocated with a thermal dissipating module according to still another embodiment of the invention.

FIG. 4 shows a pico projector system of the invention collocated with a thermal dissipating module according to still another embodiment of the invention. In this embodiment, the pico projector system includes a pico projector main body 10c and a thermal dissipating module 20c. The thermal dissipating module 20c includes an accommodation space 208c, and the pico projector main body 10c can be tightly fitted into the accommodation space 208c of the thermal dissipating module 20c. Accordingly, in the thermal dissipating module 20c, a fan can be configured to perform a forced convention to thermally dissipate a thermal dissipating fin unit (not shown in FIGs.) located inside the pico projector main body 10c.

Figure 5:
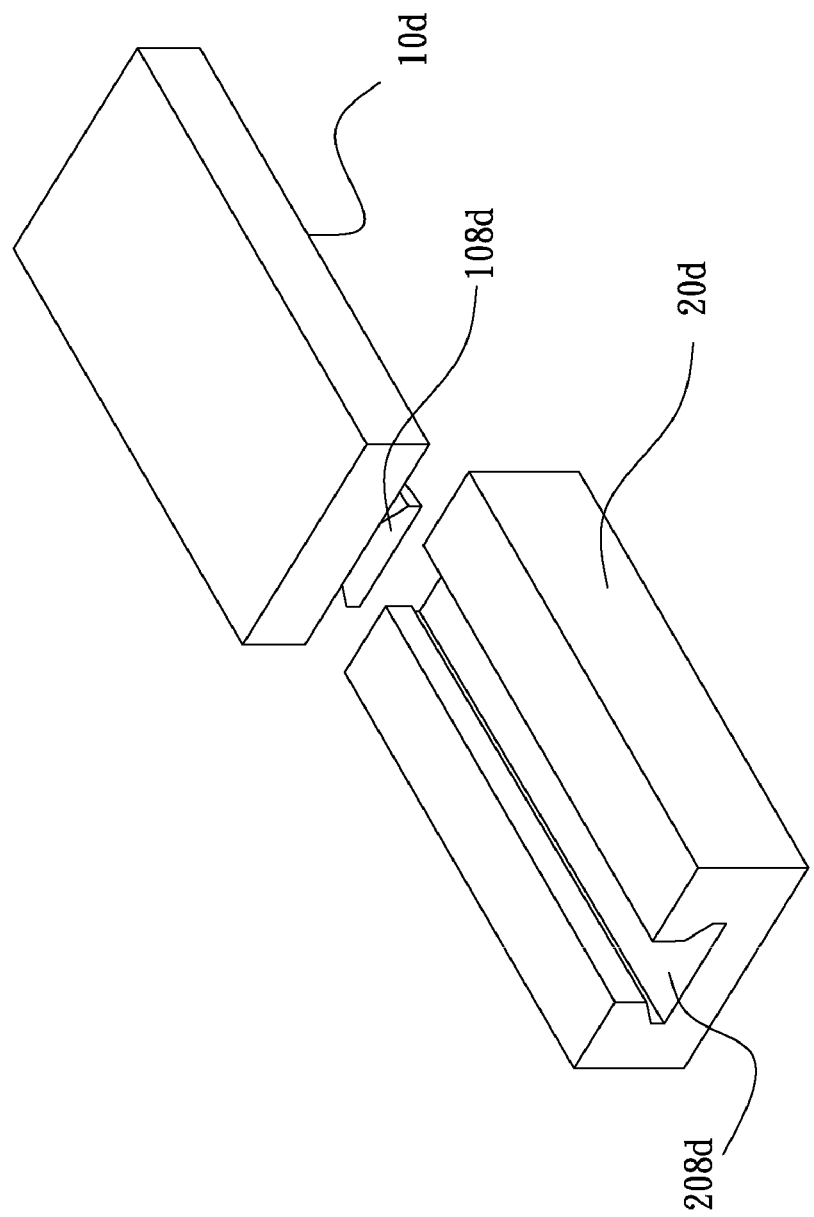
FIG. 5 shows a pico projector system of the invention collocated with a thermal dissipating module according to yet another embodiment of the invention.

FIG. 5 shows a pico projector system of the invention collocated with a thermal dissipating module according to yet another embodiment of the invention. In this embodiment, the pico projector system includes a pico projector main body 10d and a thermal dissipating module 20d. The thermal dissipating module 20d includes a groove 208d (e.g., a dovetail groove), and the pico projector main body 10d includes a sliding block 108d corresponding to the groove 208d of the thermal dissipating module 20d, so that the thermal dissipating module 20d is secured on the pico projector main body 10d when the sliding block 108d of the pico projector main body 10d is installed in the groove 208d of the thermal dissipating module 20d. Accordingly, a forced convention can be performed to thermally dissipate a thermal dissipating fin unit (not shown in FIGs.) located inside the pico projector main body 10d.

It is understood that the thermal dissipating module can include a sliding block, and the pico projector main body can include a groove corresponding to the sliding block of the thermal dissipating module, so that the thermal dissipating module can still be secured on the pico projector main body when the sliding block of the thermal dissipating module is installed in the groove of the pico projector main body.

In the above-mentioned embodiments, besides thermally dissipating the pico projector main body, the thermal dissipating module can still be served as a seat for the pico projector main body.

The invention also provides an additional enhanced thermal dissipating method for a pico projector system, comprising the steps of: thermally dissipating a pico projector main body; and providing a thermal dissipating module to externally connect the pico projector main body so that the thermal dissipating module is configured to thermally dissipate the pico projector main body. The thermal dissipating module is allowed to connect the pico projector main body when the pico projector main body has a consumed power greater than a predetermined value which is approximately equal to 2.5 watts.

In conclusion, although the internal installation of the heat pipe and the thermal dissipating fin unit for thermal dissipation is provided, these components do not additionally increase volume of the pico projector system, and portability and performance thereof can still be sustained. On the part of a pico projector system with a high power and high heating value, the thermal dissipating module not only can be arranged to enhance thermal dissipating effect, but also can be served as a seat to support the pico projector main body at a fixed location.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A pico projector system, comprising:
   a pico projector main body comprising a metal substrate, a heat pipe and a thermal dissipating fin unit;
   a thermal dissipating module, detachably and externally connected to the pico projector main body via a connection coupling and configured to thermally dissipate the pico projector main body; and
   a support frame extended along a profile of the metal substrate, in which the support frame is contacted with the metal substrate;
   wherein the heat pipe is configured to transfer waste heat generated from the metal substrate to the thermal dissipating fin unit, and the thermal dissipating module is configured to thermally dissipate the thermal dissipating fin unit.

2. The pico projector system as claimed in claim 1, wherein the heat pipe is a straight heat pipe.

3. The pico projector system as claimed in claim 1, in which the heat pipe is welded on the support frame.

4. The pico projector system as claimed in claim 3, wherein the support frame is an L-type support frame contacting the metal substrate.

5. The pico projector system as claimed in claim 1, wherein the thermal dissipating module comprises a magnet, and the pico projector main body comprises a metal part, so that the thermal dissipating module is secured on the pico projector main body when the magnet of the thermal dissipating module attracts the metal part of the pico projector main body.

6. The pico projector system as claimed in claim 1, wherein the thermal dissipating module comprises a metal part, and the pico projector main body comprises a magnet, so that the thermal dissipating module is secured on the pico projector main body when the magnet of the pico projector main body attracts the metal part of the thermal dissipating module.

7. The pico projector system as claimed in claim 1, wherein the thermal dissipating module comprises a first magnet, and the pico projector main body comprises a second magnet, so that the thermal dissipating module is secured on the pico projector main body when the first magnet of the thermal dissipating module attracts the second magnet of the pico projector main body.

8. The pico projector system as claimed in claim 1, wherein the thermal dissipating module comprises a connecting port connected to the pico projector main body, so that the pico projector main body can provide the thermal dissipating module with power.

9. The pico projector system as claimed in claim 1, wherein the thermal dissipating module comprises an accommodation space allowing the pico projector main body to be tightly fitted therein.

10. The pico projector system as claimed in claim 1, wherein the thermal dissipating module comprises a groove, and the pico projector main body comprises a sliding block corresponding to the groove of the thermal dissipating module, so that the thermal dissipating module is secured on the pico projector main body when the sliding block of the pico projector main body is installed in the groove of the thermal dissipating module.

11. The pico projector system as claimed in claim 1, wherein the thermal dissipating module comprises a sliding block, and the pico projector main body comprises a groove corresponding to the sliding block of the thermal dissipating module, so that the thermal dissipating module is secured on the pico projector main body when the sliding block of the thermal dissipating module is installed in the groove of the pico projector main body.

12. An additional thermal dissipating method for a pico projector system, comprising:
    thermally dissipating a pico projector main body;
    externally and detachably connecting a thermal dissipating module to the pico projector main body via a connection coupling; and
    thermally dissipating the pico projector main body by the thermal dissipating module;
    wherein the thermal dissipating module is connected to the pico projector main body when a consumed power of the pico projector main body is greater than a predetermined value.

13. The additional thermal dissipating method for the pico projector system as claimed in claim 12, wherein the predetermined value is approximately equal to 2.5 watts.

* * * * *